United States Patent [19]
Schricker et al.

[11] Patent Number: 5,561,610
[45] Date of Patent: Oct. 1, 1996

[54] METHOD AND APPARATUS FOR INDICATING A FAULT CONDITION

[75] Inventors: David R. Schricker, Dunlap; Satish M. Shetty, East Peoria, both of Ill.

[73] Assignee: Caterpillar Inc., Peoria, Ill.

[21] Appl. No.: 268,693

[22] Filed: Jun. 30, 1994

[51] Int. Cl.$^6$ .................................................. G08B 23/00
[52] U.S. Cl. ........................................ 364/551.01; 340/679
[58] Field of Search ................................ 340/679, 680; 364/550, 551.01, 551.02

[56] References Cited

U.S. PATENT DOCUMENTS

| | | | |
|---|---|---|---|
| Re. 31,750 | 11/1984 | Morrow | 364/550 X |
| 3,257,652 | 6/1966 | Foster | 340/680 X |
| 3,298,010 | 1/1967 | Dubosq et al. | 340/679 X |
| 3,882,305 | 5/1975 | Johnstone | 235/151.11 |
| 3,946,364 | 3/1976 | Codomo et al. | 340/172.5 |
| 4,093,939 | 6/1978 | Mitchell | 340/52 |
| 4,184,205 | 1/1980 | Morrow | 364/550 X |
| 4,542,461 | 9/1985 | Eldridge et al. | 364/424 |
| 4,583,176 | 4/1986 | Yamato et al. | 364/431.11 |
| 4,749,987 | 6/1988 | Ishii | 340/587 |
| 4,787,053 | 11/1988 | Moore | 364/551.01 |
| 4,803,469 | 2/1989 | Matsushita | 340/577 |
| 4,825,195 | 4/1989 | Berruyer | 340/501 |
| 4,967,381 | 10/1990 | Lane et al. | 364/551.01 |
| 5,155,468 | 10/1992 | Stanley et al. | 340/501 |
| 5,258,923 | 11/1993 | Imam et al. | 364/508 |
| 5,303,163 | 4/1994 | Ebaugh et al. | 364/550 |

*Primary Examiner*—Edward R. Cosimano
*Attorney, Agent, or Firm*—Steven R. Janda; Mario J. Donato

[57] ABSTRACT

An apparatus is provided for indicating a fault condition in a machine having a plurality of parameters each having levels being dependent upon machine performance. The apparatus includes a sensor adapted to produce an electrical signal in response to the level of one of the of parameters; and a processor for identifying a trend in the parameter level in response to the electrical signal, calculating the duration and slope of the trend; and determining whether a first warning threshold is exceeded in response to the duration and slope of the trend, the first warning threshold being a function of duration and slope.

16 Claims, 10 Drawing Sheets

Fig_3

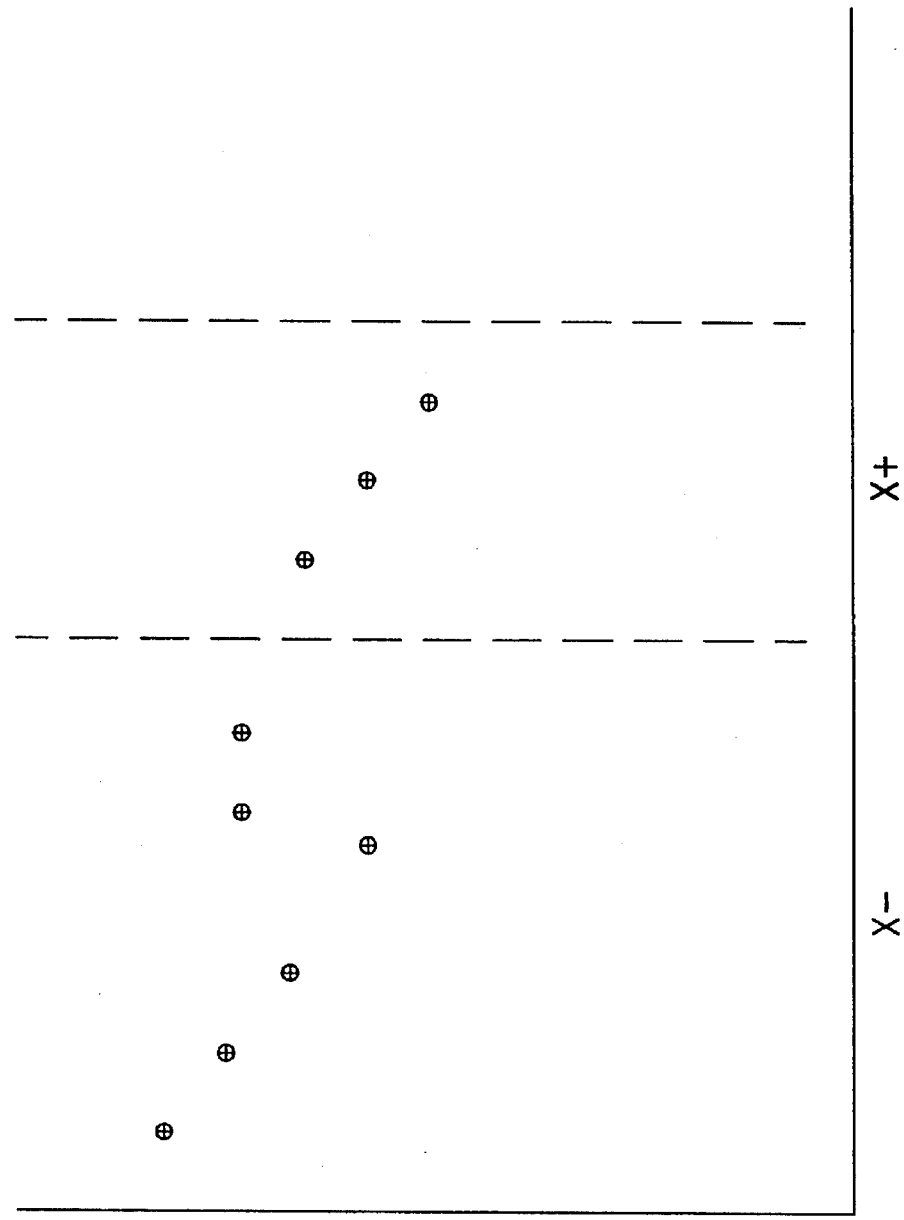

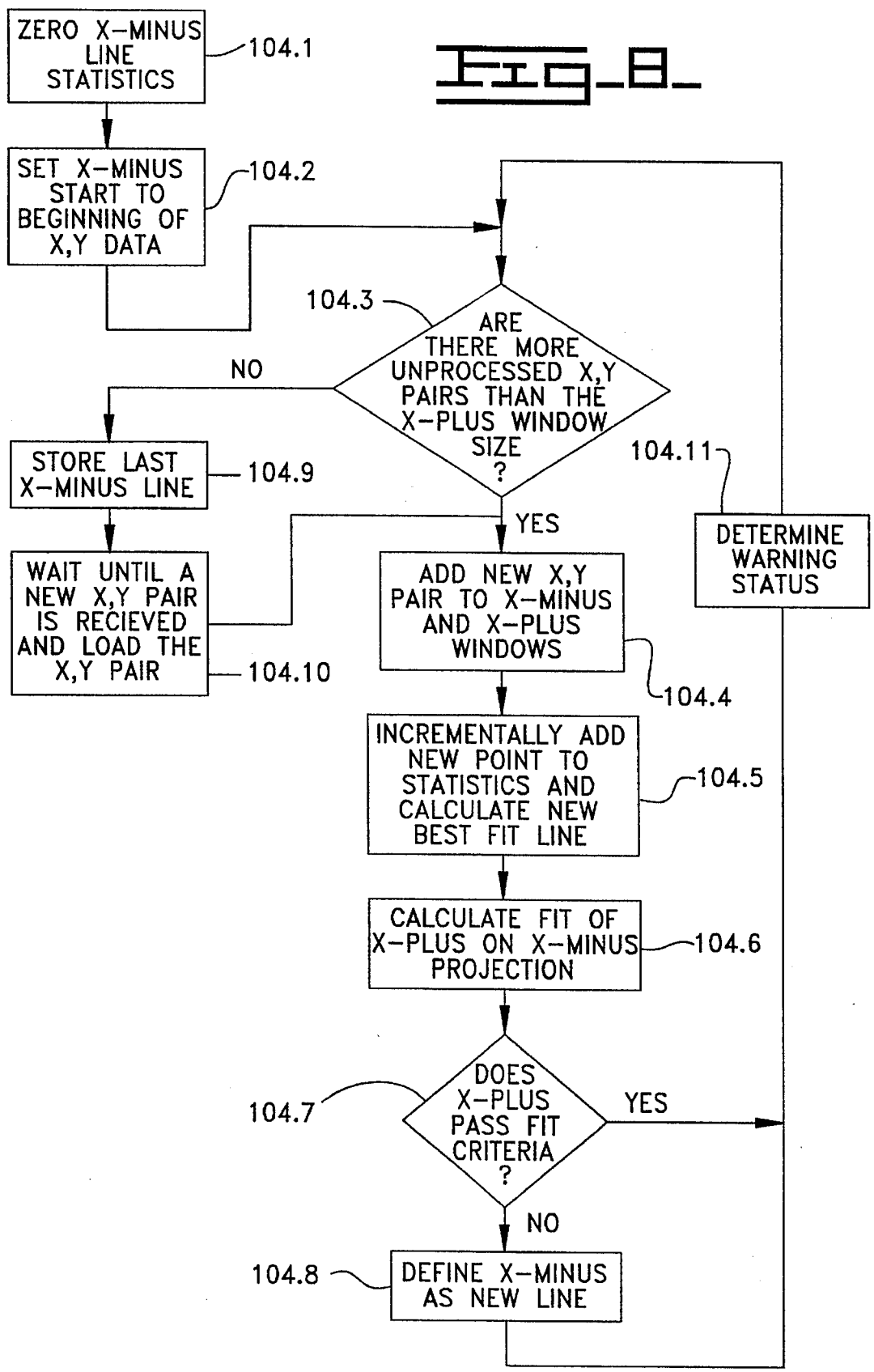

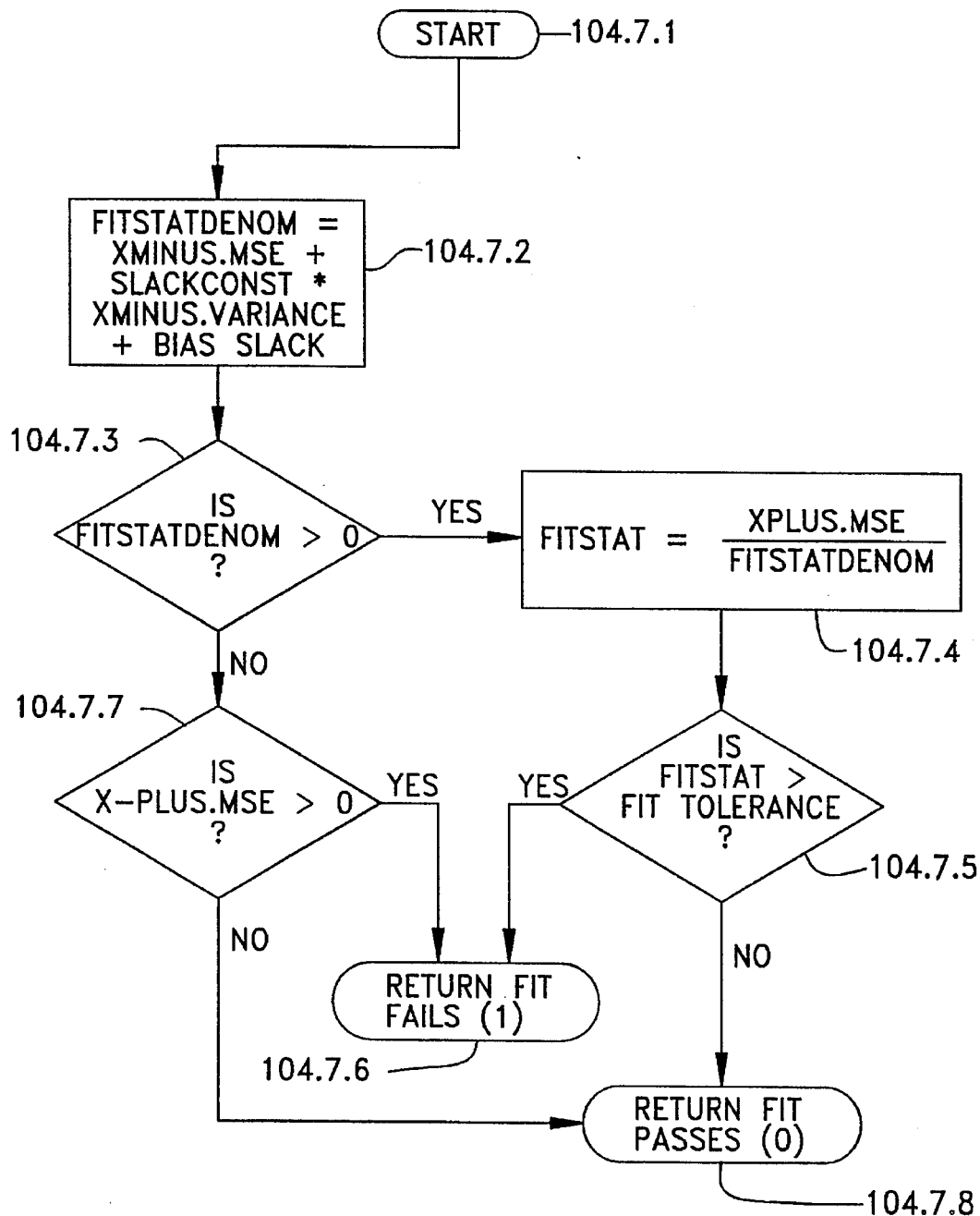
Fig-9-

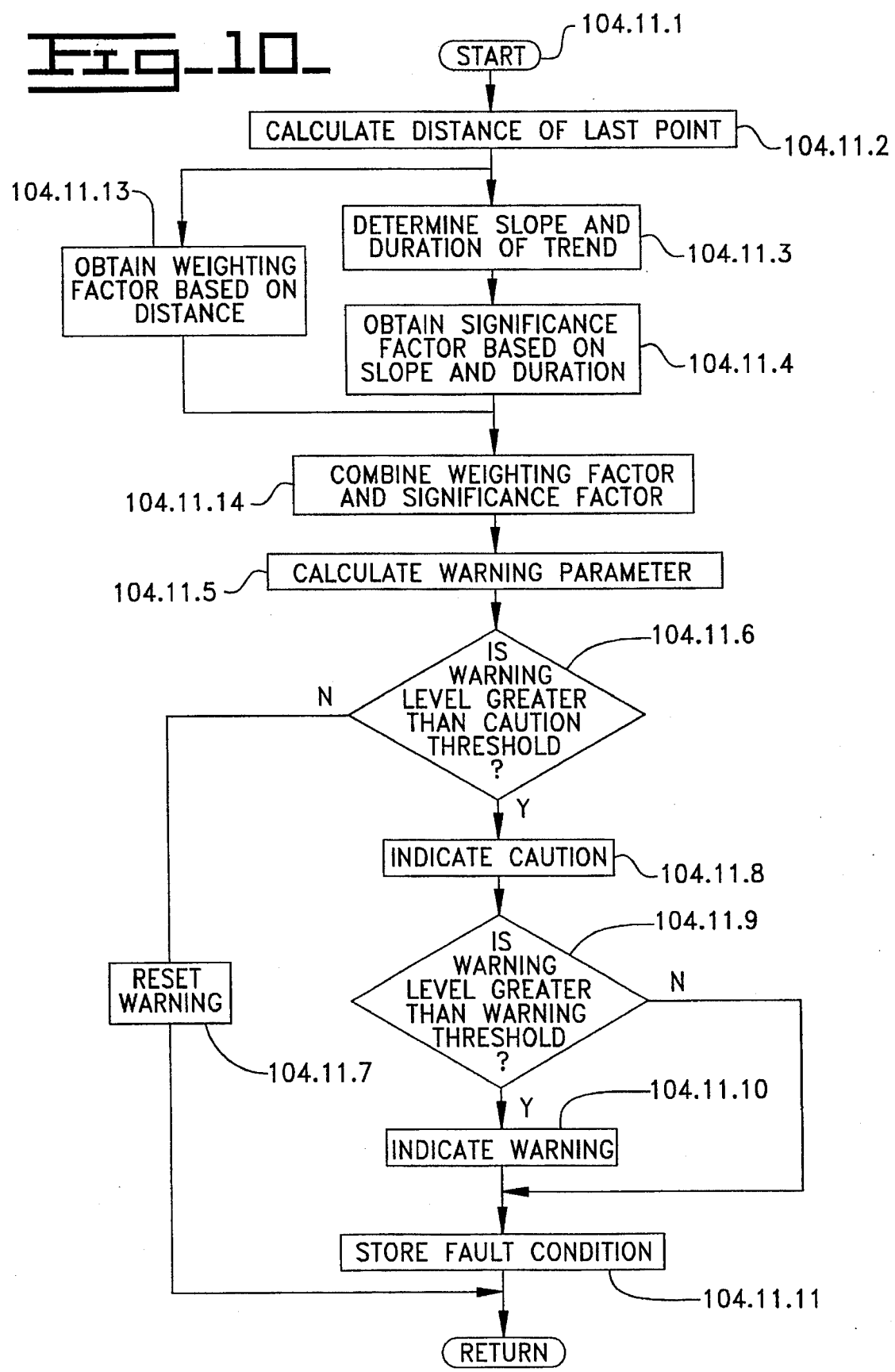
Fig_10

METHOD AND APPARATUS FOR INDICATING A FAULT CONDITION

TECHNICAL FIELD

The invention relates generally to devices for diagnosing and indicating fault conditions, and more particularly, to a method and apparatus for diagnosing and indicating a fault condition in response to the trend in the level of a machine parameter.

BACKGROUND ART

For service and diagnostic purposes, machines are sometimes equipped with sensors for measuring operating conditions such as engine RPM, oil pressure, water temperature, boost pressure, oil contamination, electric motor current, hydraulic pressure, system voltage, and the like. In some cases, storage devices are provided to compile a data base for later evaluation of machine performance and to aid in diagnosis. Service personnel examine the accrued data to get a better picture of the causes of the failure or to aid in diagnosis. Similarly, service personnel evaluate the stored data to predict future failures and to correct any problems before total component failure.

In addition, these stored parameters may be examined by service or supervisory personnel to evaluate machine and/or operator performance to ensure maximum productivity of the machine. These issues are particularly pertinent to over-the-highway trucks and large work machines such as off-highway mining trucks, hydraulic excavators, track-type tractors, wheel loaders, and the like. These machines represent large capital investments and are capable of substantial productivity when operating. It is therefore important to predict failures so servicing can be scheduled during periods in which productivity will be less affected and so minor problems can be repaired before they lead to catastrophic failures.

Similarly, it is sometimes advantageous to accumulate parameters only when the machine is in a particular operating condition. This type of information is predominantly used during performance evaluation but may also be used in failure diagnosis and prognosis. For example, the length of time spent in a particular gear while the machine is loaded may be needed to evaluate machine performance.

The present invention is directed to overcoming one or more of the problems set forth above.

DISCLOSURE OF THE INVENTION

In one aspect of the invention, an apparatus is provided for indicating a fault condition in a machine having a plurality of parameters each having levels being dependent upon machine performance. The apparatus includes a sensor adapted to produce an electrical signal in response to the level of one of the parameters; and a processor for identifying a trend in the parameter level in response to the electrical signal, calculating the duration and slope of the trend; and determining whether a first warning threshold is exceeded in response to the duration and slope of the trend, the first warning threshold being a function of duration and slope.

In a second aspect of the invention, a method of indicating a fault condition is provided. The method includes the steps of sensing a parameter having a level being dependent upon machine performance and responsively producing an electrical signal, identifying a trend in the parameter level, calculating the duration and slope of the trend, and determining whether a first warning threshold is exceeded in response to the duration and slope of the trend, the first warning threshold being a function of duration and slope.

The invention also includes other features and advantages which will become apparent from a more detailed study of the drawings and specification.

BRIEF DESCRIPTION OF THE DRAWINGS

For a better understanding of the present invention, reference may be made to the accompanying drawings, in which:

FIG. 6 illustrates one instance of a group of data points being used to obtain a line segment;

FIG. 8 illustrates a portion of the algorithm of FIG. 7 in more detail;

FIG. 9 illustrates a portion of the algorithm of FIG. 8 in more detail; and

FIG. 10 illustrates a portion of the algorithm of FIG. 8 in more detail.

BEST MODE FOR CARRYING OUT THE INVENTION

Figure 1:
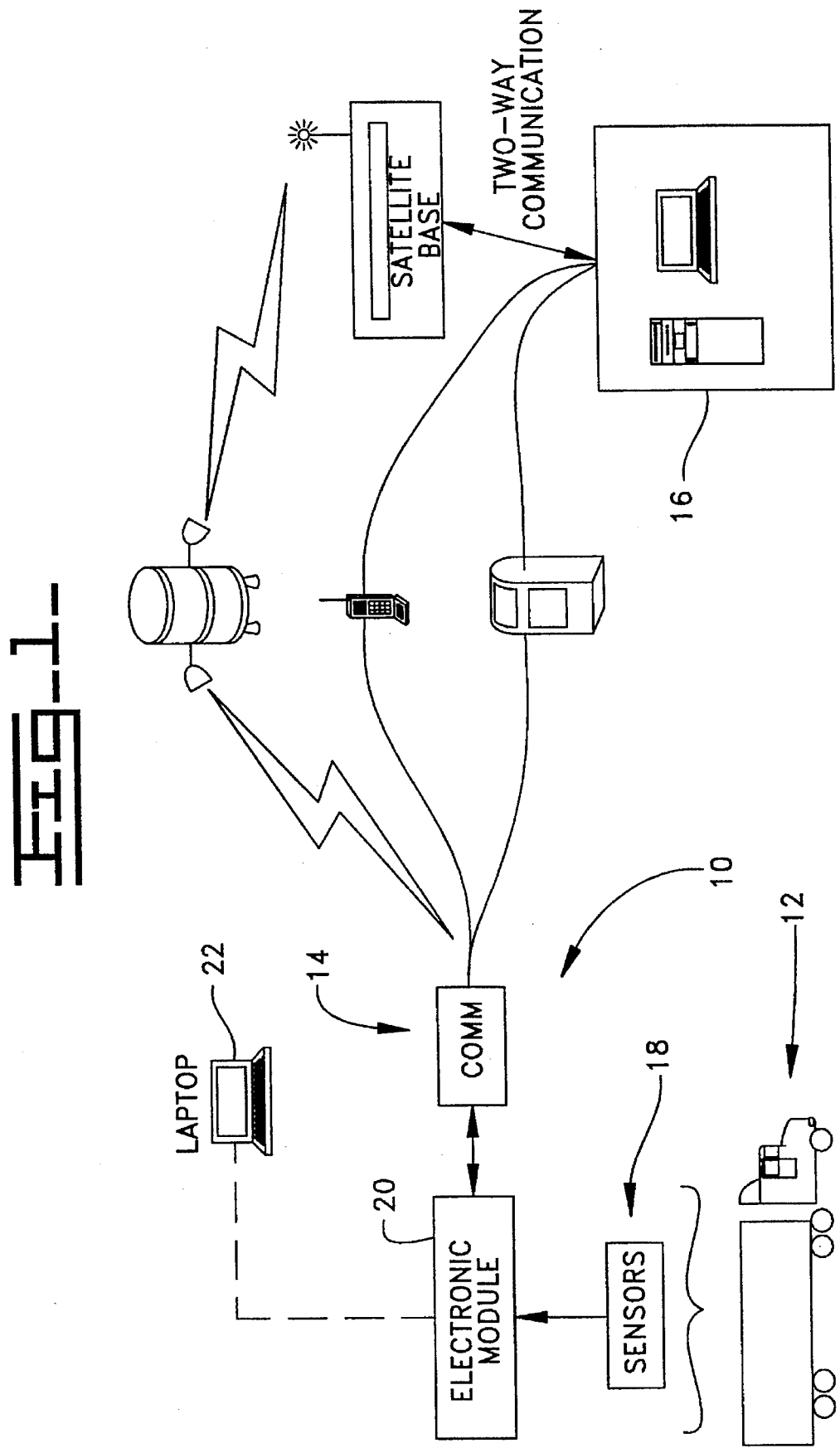
FIG. 1 is a high level diagrammatic illustration of an embodiment of the invention.

Referring to FIG. 1, a machine prognostic system is shown generally by the number 10 and is a data acquisition, analysis, storage, and display system for a work machine 12. Employing a complement of on-board and off-board hardware and software, the machine prognostic system 10 monitors and derives machine component information and analyzes the resulting data to indicate impending component or system failures.

FIG. 1 illustrates a variety of potential communication systems 14 that may be used to transfer data from the work machine 12 to a central computer system 16 for analysis. In the preferred embodiment, the data is transferred by the Qualcomm satellite system back to the central computer system 16. Alternatively, the data is transferred by a cellular telephone system or by storing data on a computer disk which is then mailed to the central computer site for analysis.

It should be understood that all aspects of the present invention could be located on-board the work machine 12 thereby eliminating the need for a communication system 14; however, the central computer system 16 allows an entire fleet to be monitored at a central location.

Subsets of the data are also transmitted to a display module (not shown) in the operator compartment of the work machine 12 for presentation to the operator in the form of gauges and warning messages. During normal operation, gauge values are displayed in the operator compartment.

During out-of-spec conditions, alarms and warning/instructional messages are also displayed.

In the preferred embodiment, sensed data is directly sampled by sensors 18 of a type well-known in the art for producing electrical signals in response to the level of operational parameters and includes pulse-width modulated sensor data, frequency-based data, five volt analog sensor data, and switch data that has been effectively debounced. The sensors are connected to an electronic module 20 for delivery of the sensor signals.

Figure 2:
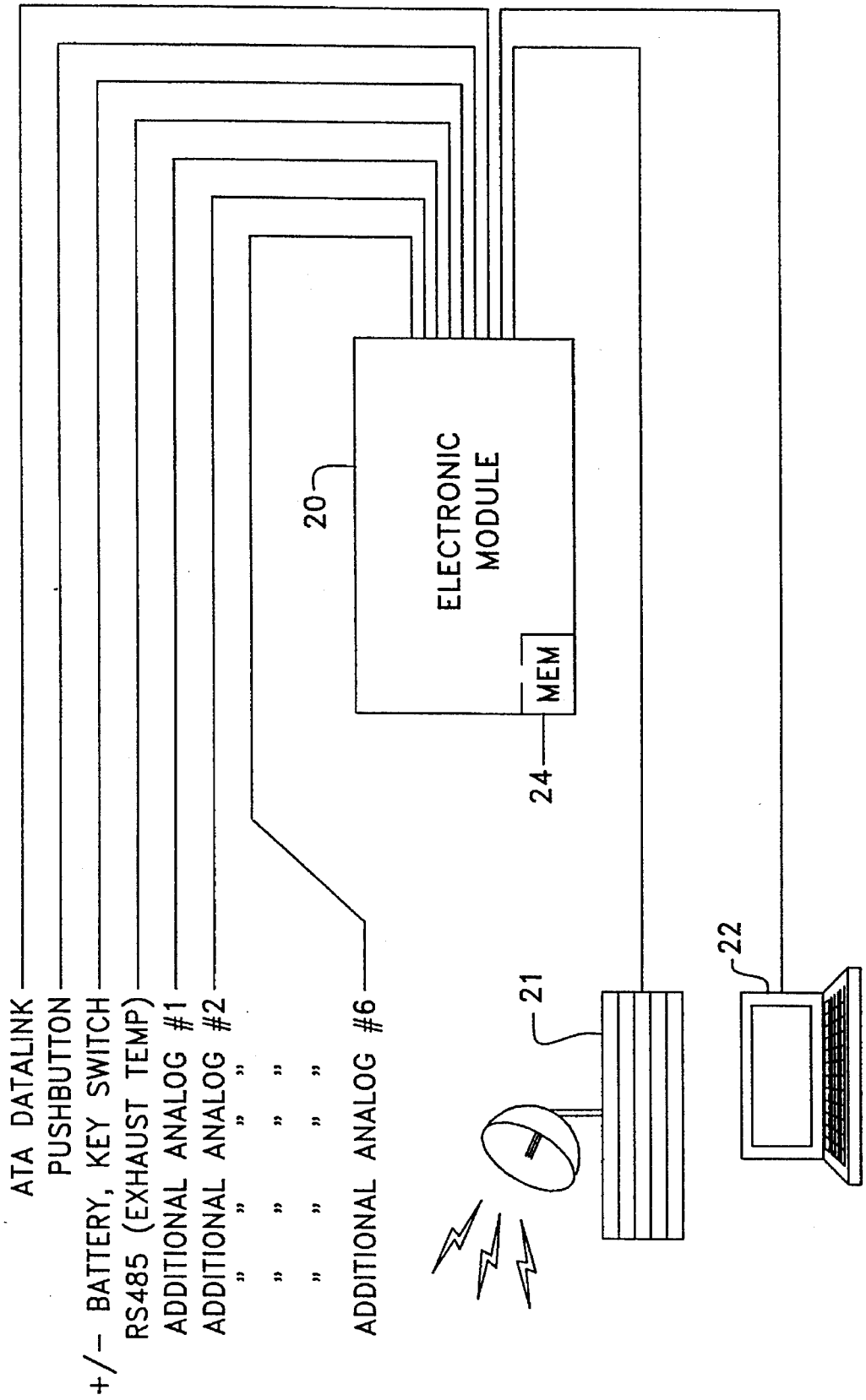
FIG. 2 illustrates a plurality of connections to an electronic module in one embodiment of the invention.

In the embodiment of FIGS. 1 and 2, the sensor signals are delivered to the electronic module 20 by either direct connection of analog sensors, connection by way of an RS485 link, or over a datalink governed by SAE specifications J1587 and J1708. A pushbutton is also included to trigger the acquisition of a snapshot of data. Connection is also provided from the machine battery and key switch to the electronic module 20.

In the preferred embodiment, the electronic module 20 includes a Motorola 68000 microprocessor, a lower level communications board (not shown) of a type well-known in the art, and a memory section 24 including high level flash memory and battery backed RAM. The electronic module also includes a pair of RS232 connections, one being available for connection to the satellite communications system 21 and the other being available for connection to an off-board computer 22 used in download of data and initialization of the system. In the preferred embodiment, the off-board computer 22 is a laptop personal computer.

To document the performance of the machine and/or its major components, performance baselines are stored in an array within the memory device located in the electronic module 20. These baselines are used during key, repeatable performance checks of the machine to help verify machine/component health and, as discussed below, are used as reference points to determine whether the machine is in an operating condition in which machine parameters are to be processed and stored.

A subset of parameters for which trend data is to be produced is either predefined or defined via the off-board computer 22 or the central computer 16. Each parameter includes a dependency definition that identifies the conditions under which data will be stored for trending purposes. Typically, the dependency definition is selected to indicate the normal operating conditions of the machine; for example, when engine RPM are above a certain level and boost pressure is above a predetermined level. The trending definition for each parameter may vary and may be a function of several other machine parameters that shall be referred to as dependencies. Trend data is gathered and stored in memory as the specified dependency definition is met over a specified trend period, which is measured either in time, such as over a period of ten hours, or in counts, such as over a period of ten transmission shifts. Trend data is only obtained while the engine is running. Based on the specified trend type, the maximum, minimum, or cumulative value of data gathered during this period is then stored as a single trend point with counts to determine the average value and/or the points available. The determination of whether to use the average, maximum, or minimum value to obtain the trend point is based on the system designer's decision regarding which type of calculation would provide the best indication of changes in engine performance or impending failures. It should also be understood that multiple values could be calculated for the same sensed parameter, i.e. trend points could be calculated to indicate both an average value and a minimum value for a designated machine parameter.

The overall trend is formed by storing a specified number of points in the memory device depending on the size of the available memory area and the length of the desired historical data base.

Trend data may be reset and the definitions may be redefined by the off-board system 22 via one of the communication ports. For example, if a particular application of the machine requires a different dependency definition for one or more of the sensed parameters, the off-board system 22 is used to modify the dependency definition by providing commands to erase a given array including a given dependency definition and replace that definition with a new dependency definition. Similarly, this function may be performed by the central computer system 16 via the communication system 14.

In addition to the trend data produced for sensed parameters, it should be understood that calculated values, such as net horsepower or driveline torque, may also be trended in a similar manner. Typically, these calculated values are determined by the electronic module 20 according to predetermined definitions in response to a plurality of sensed parameter signals.

Figure 3:
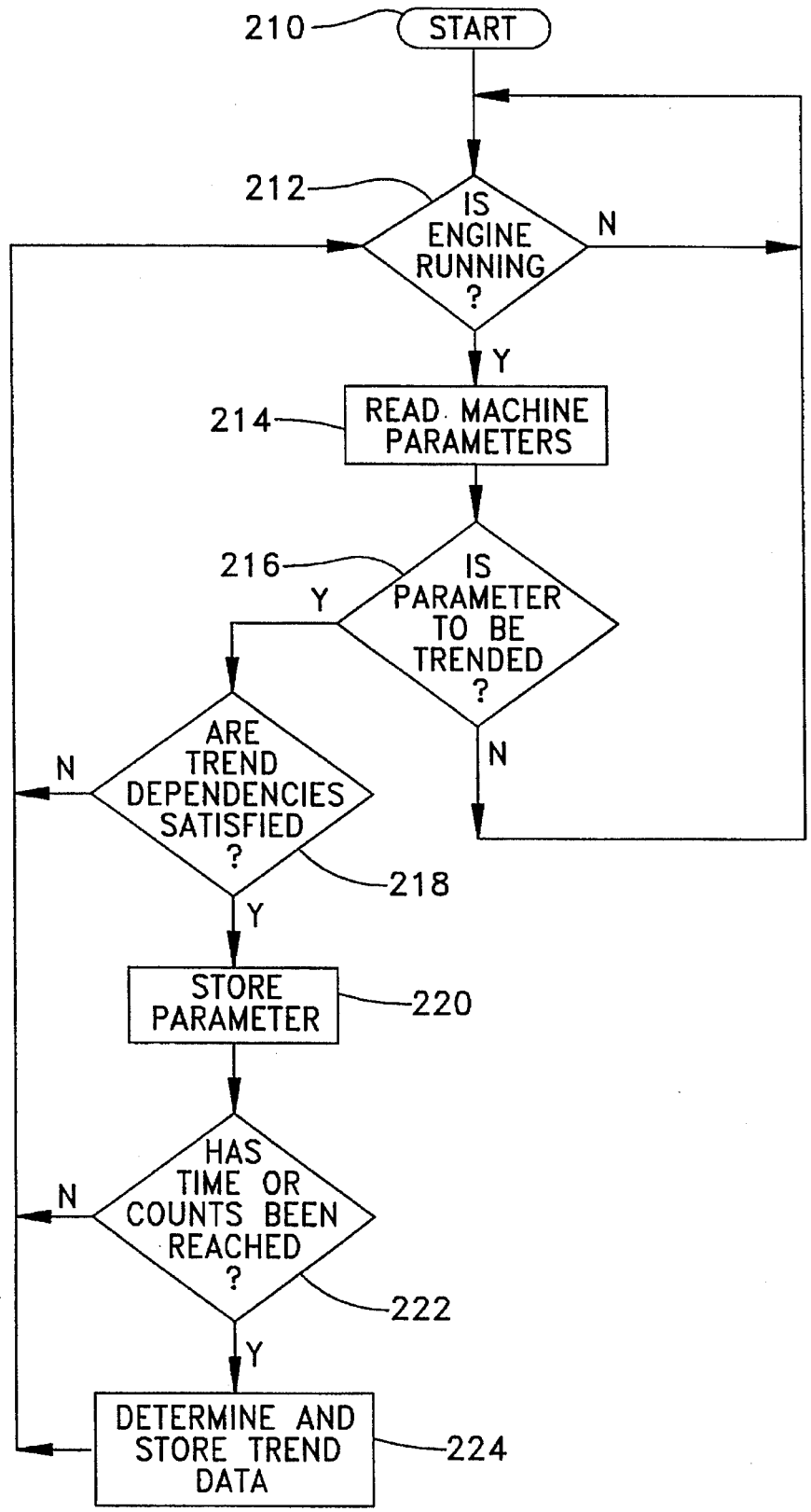
FIG. 3 illustrates an algorithm performed by the electronic module in one embodiment of the invention.

Referring now to FIG. 3, an algorithm incorporated in an embodiment of the invention and executed by the processor within the electronic module 20 to perform the above functions is now described. In block 212. The electronic module 20 determines whether the engine is running. Advantageously, the engine is determined to be running if engine speed exceeds cranking engine speed. If the engine is not running, then the algorithm will not proceed. If the engine is running, control proceeds to block 214 where the electronic module 20 reads the sensed machine parameters from the datalink or other inputs.

For each of the sensed parameters, the electronic module 20 determines at block 216 whether that parameter is to be processed to provide trend data. If trend data is to be provided, the trending definition is retrieved and the dependency parameters are checked at block 218 to determine whether the dependency definition is satisfied. If the dependency definition is not satisfied, control returns to block 212. The dependency definition for each operating parameter of interest is defined in terms of other sensed machine parameters. For example, the dependency definition for boost pressure may be satisfied only when engine rpm is greater than a low operating speed and less than a high operating speed, when the engine rack setting is greater than a predetermined level, and when the jacket water temperature is greater than a predefined operating temperature. That is, values for boost pressure are only saved and processed for producing trend information when the above conditions are satisfied. In this way, all boost pressure values used to produce the trend data will have been acquired when the engine is in the same general operating condition. It should be understood that the actual ranges, minimums, and maximums used in the dependency definitions are determined empirically to define the operating conditions of interest and will vary from machine to machine and application to application.

If the dependency definition is satisfied, control proceeds to block 220 where the value of the sensed parameter is stored. This process is continued until, at block 222, either the time period over which each trend point is to be determined or the number of events for which each trend point is to be determined is reached at which point control proceeds to block 224 where the electronic module 20 calculates and stores the trend point. The time period or number of events is selected in response to the designer's desire for precision, the availability of memory space in the memory device, and the length of time or number of counts required to obtain meaningful trend points. The calculation of the trend point may include accumulating the stored values, selecting the maximum stored value, or selecting the minimum stored value. The calculated trend point is saved and the data array for that parameter is then cleared to allow for the storage of data for calculation of the next trend point for that parameter.

Figure 4:
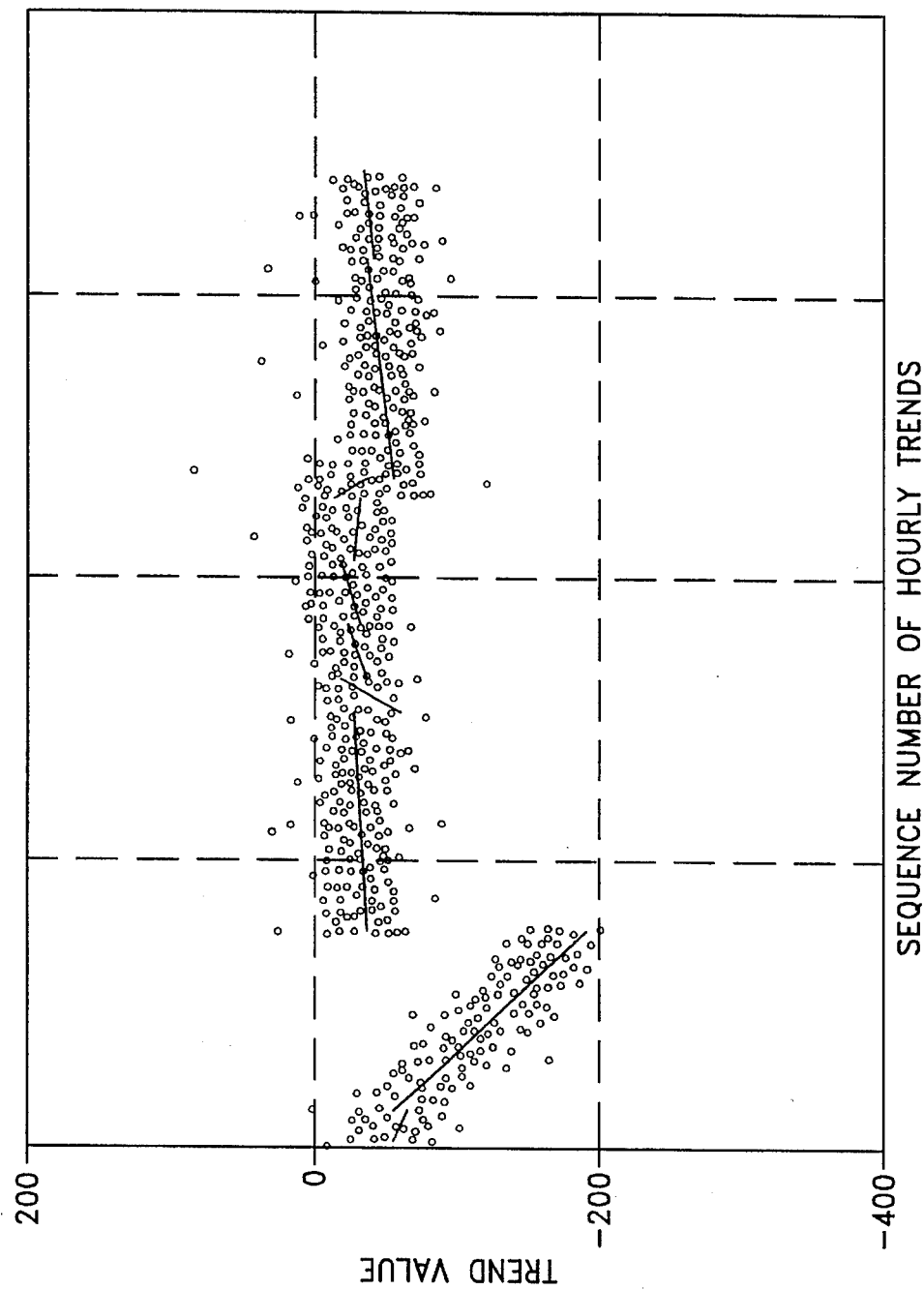
FIG. 4 illustrates a plurality of sensor values and best-fit line segments.
Figure 7:
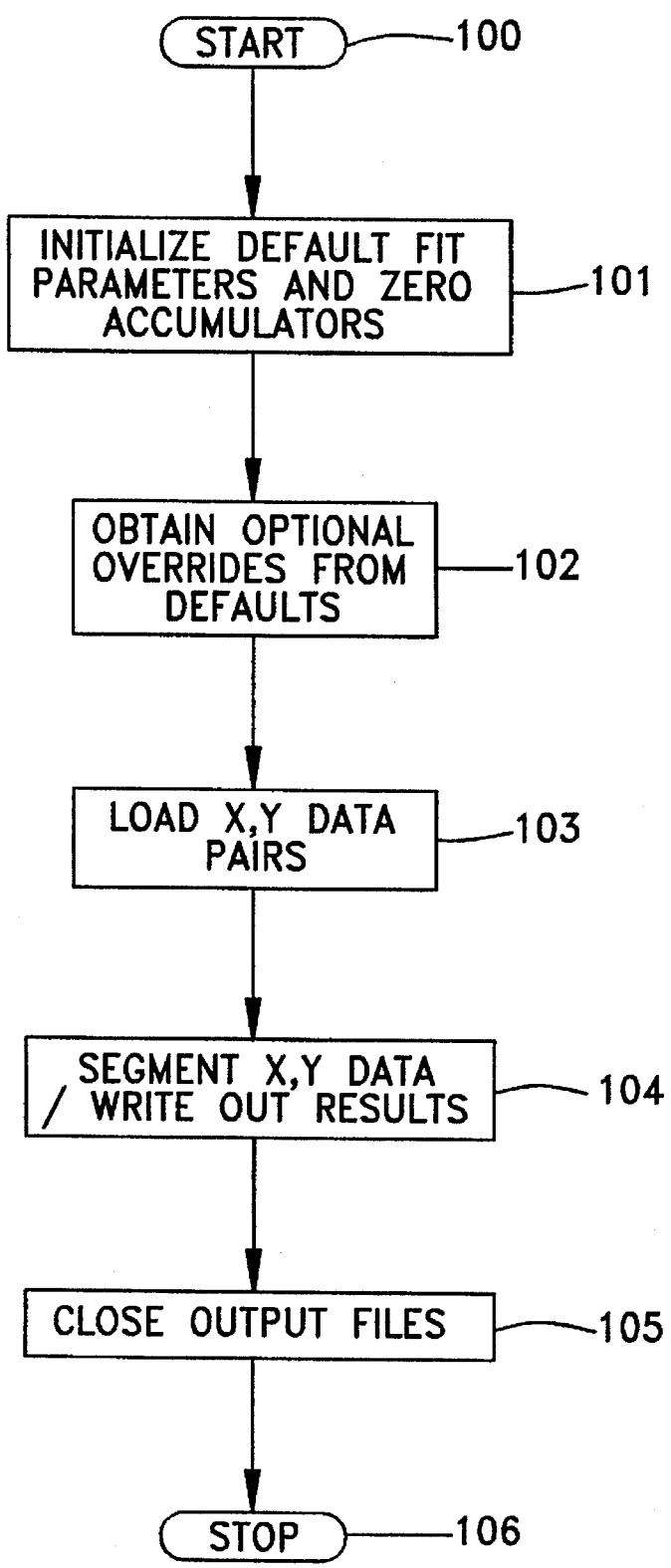
FIG. 7 illustrates a high level algorithm performed in one embodiment of the invention.

Trend data obtained by way of the algorithm of FIG. 3 is illustrated in FIG. 4. While the illustrated data has a substantial variance, straight lines can be fit to the data to illustrate the general trend of the data by known curve fitting techniques, such as the least-squares method. The method of determining when a particular straight line trend should be terminated and a new line segment defined is described below in connection with the algorithm of FIG. 7.

Figure 5:
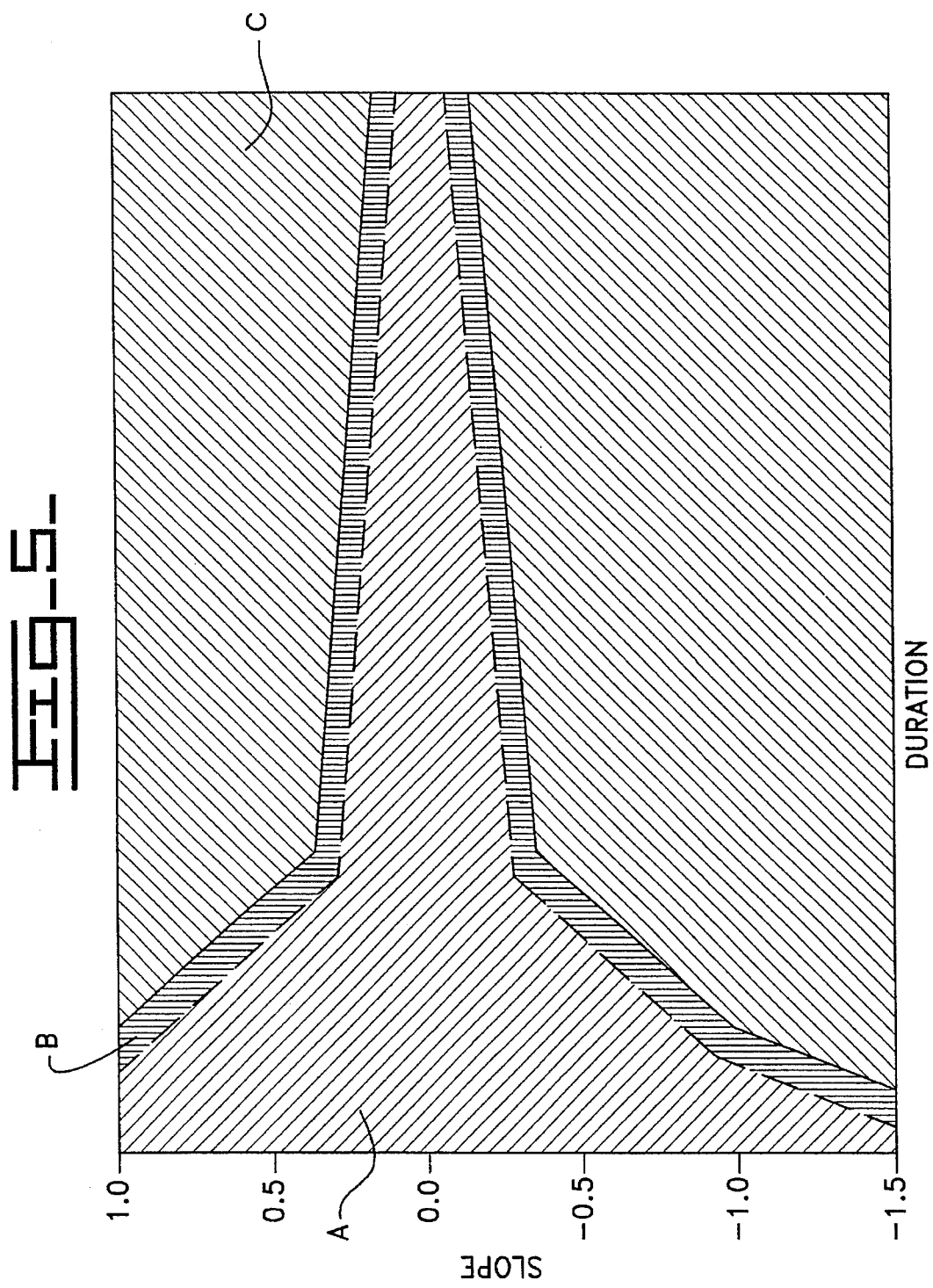
FIG. 5 illustrates warning levels as a function of slope and duration of trended data.

Based on the slope and duration of the trends illustrated in FIG. 4, certain judgements can be made regarding the likelihood of impending component or system failure. As shown in FIG. 5, functions may be defined in terms of slope and duration of particular trends whereby warning conditions are indicated in response to either the parameter of interest changing at a very high rate for even a small period, or at a relatively low rate for an extended period. The area indicated by the letter "A" indicates the various combinations of slope and duration of trends associated with normal operating conditions. The areas indicated by the letters "B" and "C" indicate the caution region and warning region, respectively. That is, normal conditions are indicated if the magnitude of either the slope or duration of a particular trend is relatively small, but as the magnitude of the slope and duration increase, the likelihood of a fault condition increases.

Turning now to FIG. 6, the method of defining a particular line segment associated with a trend in the sensed data is described. A first region of data points in a series of data are selected and indicated by X−. A second region of data points immediately following X− are selected and indicated by X+. The sizes of X− and X+ are arbitrary but, in the illustrated embodiment, X− consists of 6 data points and X+ consists of the following 3 data points. In some embodiments, X+ may include only a single data point; however, multiple points are desirable for X+ to reduce the likelihood that a single aberrant point will cause a line segment to be terminated.

The data points in X− are used to calculate a best fit line using a known technique such as least squared errors. Using the derived equation of the line, the data in X+ is tested to determine whether the line segment should continue such that the data points of X+ are added to the line segment data or whether a new line segment should be started and the previous segment terminated. This test is performed by using the following inequality:

$$\text{Fit-Statistic} = \frac{MSE(X+, \hat{x}+ \text{ Based on } X\text{-Regression})}{MSE(X-, \hat{x}-) + \text{deviation slack} + \text{bias slack})} < \text{Fit tolerance}$$

where: MSE is the mean squared error;
deviation slack is a bias to the denominator of the fit statistic to discount MSE changes when there is a high slope to the trend and in the preferred embodiment is equal to a slack constant multiplied by the variance of X−;

fit tolerance is a constant controlling the tightness of fit of the data allowed for a given line segment, in the preferred embodiment is equal to 4.8; and bias slack is a constant used to prevent a new line segment from being formed in the event that the MSE of X− is zero. In the preferred embodiment, bias slack is set equal to zero and decision blocks are included in the algorithm shown in FIG. 9 to handle situations where the fit statistic denominator is equal to zero.

If the inequality is true, the left most data point in X+ is moved to X− and a new data point is moved to the right most side of X+. If the inequality is false, the line segment is terminated and a new X− is defined beginning with the next data point following the defined line segment.

In one embodiment, if the inequality is false, a fit statistic base is set equal to the present fit statistic. Data points are then continuously added to X− and a new fit statistic is calculated when each new data point is added. Data points are no longer added to X− when the fit statistic reaches a preselected fit poorness percentage indicative of the minimum ratio of the fit statistic base to the fit tolerance. This allows a subset of the data points in X+ to be added to the line segment if the trend actually changes in the middle of X+ rather than at the beginning of the X+ group of data points.

The algorithms performed by the present invention are now described in connection with FIGS. 7 through 10. At block 100, the algorithm is started. At block 101, the default fit parameters are initialized and any accumulated values are set equal to zero. At block 102, the system determines whether there have been overrides of the defaults. At block 103, data points are loaded into the computer system by way of one of the communication systems. For each of the data points, the time at which it was stored and its magnitude are arbitrarily chosen as X and Y. This data is next processed at block 104 which is described in more detail in connection with FIG. 8. Following processing of the data, the output files are closed at block 105 and the algorithm is terminated at block 106.

The functions described in connection with blocks 104 and 105 describe a system in which the analysis of data occurs off-board the machine at a central computer 16. In an alternative embodiment, the analysis occurs on-board the machine in the electronic module 20 on a real-time basis. In this case, the results of the processing in block 104 are stored but not written out and the function of block 105 is omitted.

Turning now to FIG. 8, the X− minus statistics are zeroed and the X− window is filled with the beginning data points at blocks 104.1 and 104.2, respectively. The computer then determines whether there are more unprocessed data points than the number of points to be included in the X+ window at block 104.3. If yes, the left most point in X+ is moved to the right most position in X− and a new data point is added to the X+window at block 104.4. New statistics are then calculated to arrive at a new best fit line for X− using the least squared errors technique at block 104.5, although other curve fitting techniques are equally suitable. The mean squared error of the data points in the X+ window is then calculated at block 104.6 with respect to the best fit line derived in block 104.5 to determine the relative fit of the data points in X+ with respect to the line determined using the X− data points as compared to the fit of the data points in X−. At block 104.7, and as set forth in more detail in FIG. 9, a determination is made as to whether the data points in X+ are a part of the trend described by the X− line segment or whether a new line segment should be defined to describe a new trend.

Block 104.7.1 is the start of this determination. In block 104.7.2 the fit statistic denominator of the equation discussed above is calculated. If the fit statistic denominator is greater than zero at block 104.7.3, the fit statistic is calculated at block 104.7.4 and compared to the fit tolerance at block 104.7.5. If the fit statistic is less than the fit tolerance then the fit passes at block 104.7.8, otherwise the fit fails at block 104.7.6. If the fit statistic denominator is not greater than zero, then the fit fails if the means squared error of X+ computed at block 104.7.7 is greater than zero, otherwise the fit passes.

If the fit passes, then the warning status is determined at block 104.11. If the fit fails, then the data points in X− are defined as a new line segment at block 104.8 and the warning status is determined at block 104.11. If there are no unprocessed X, Y pairs in the X+ window, then the statistics corresponding to the last X− line is stored at block 104.9. At block 104.10, the system waits until a new X, Y pair is available and loaded and the process continues from 104.4.

The detailed operation of the warning status determination block at 104.11 is set forth in FIG. 10 at block 104.11.1. At block 104.11.2 the distance of the last point in X+ from the mean of the data points in X− and X+ is calculated in standard deviations. Alternatively, the position of the data point is determined with respect to predefined warning levels such that an indication is provided of the relative distance of the data point from a warning level.

The slope and duration of the line segment is determined at block 104.11.3 from the equation of the X− line segment obtained using the least squared technique, although other curve fitting techniques may be used. At block 104.11.4 based on this slope and duration, the computer obtains a significance factor from a look-up table of a type well-known in the art. The value of the significance factor increases as slope and duration of the trend increase. That is, for any given slope, the significance factor increases as duration increases; and for any given duration, the significance factor increases as slope increases. The precise values used in the look-up table are selected as a matter of design choice such that faults are indicated only when there is a substantial likelihood that a failure is imminent.

In one embodiment, the significance factor itself is used to determine whether a fault condition is indicated. Alternatively, a warning parameter is calculated at block 104.11.5 by multiplying the significance factor by the distance from the mean in standard deviations obtained in block 104.11.2. In another embodiment, a number weighting factor at block 104.11.13 indicative of the relative distance of the data point from a warning level as computed in block 104.11.12 is combined at block 104.11.4 with the significance factor to produce a warning parameter at block 104.11.5. The mean used in block 104.11.2 may be one of either an exponential weighted average of data points, a mathematical average of a predetermined number of the most recent data points, a mathematical average of all data points stored since the last servicing of the machine, or any other similar procedure for determining a historical mean.

The determination of the warning parameter adds a third dimension to the illustration of FIG. 5 such that the warning levels are a function of not only slope and duration, but also distance from the mean. In this way, a lesser significance factor is required to indicate a fault condition when the parameter level is a substantial distance from the mean or near a warning level.

The warning parameter is then compared to a caution threshold. In the preferred embodiment, if in block 104.11.2 the data point is below the mean, the resulting distance is expressed as a negative number and similarly, if the slope is negative, the resulting significance factor is negative. This approach eliminates the false indications of fault conditions that may occur when the parameter level is low but is returning to the mean along a trend having a significantly positive slope for a sufficient duration.

If the warning parameter is less than the caution threshold at block 104.11.6, then the line segment is in a range similar to the two-dimensional area "A" in FIG. 5 which indicates a normal operating condition. Any warning that had been active is then reset at block 104.11.7.

If the warning parameter is greater than the caution threshold at block 104.11.6, then the line segment is outside the normal operating region. If the warning parameter is greater than the caution threshold but less than the warning threshold, then the line segment is in a region similar to the two-dimensional area "B" in FIG. 5 which indicates a caution region as shown at block 104.11.8. If the warning parameter is greater than the warning threshold as indicated at block 104.11.9, then the line segment is in a region similar to the two-dimensional area "C" in FIG. 5 which indicates a warning region. This warning is indicated at block 104.11.10 and stored at block 104.11.11. As stated above, in an alternative embodiment, the significance factor itself is compared to caution and warning thresholds and thereby fall into the regions identified in FIG. 5. If the warning parameter is not greater than the warning threshold, control proceeds to block 104.11.11 where the fault condition is stored.

The existence of fault conditions are indicated by any of a plurality of available warning means, such as lights or horns, at either or both of the work machine 12 and central computer system 16. The existence of the fault condition is also stored for use by diagnostic personnel. Control returns to block 104.3. If no more data is found at block 104.3, then the last X− line is output and output files are closed at block 105.

Industrial Applicability

Work machines such as over-the-highway trucks and large mining and construction machines represent large capital investments and significantly reduce overall productivity for the owner when they are being repaired. To reduce the loss of productivity, the present invention is used to provide service and supervisory personnel with historical data relating to sensed machine parameters. This historical data is then used to diagnose failures, predict future failures, and evaluate machine and/or operator performance.

Other aspects, objects, and advantages of this invention can be obtained from a study of the drawings, the disclosure, and the appended claims.

We claim:

1. An apparatus for indicating a fault condition, comprising:

a machine having a plurality of parameters having levels being dependent upon machine performance;

a sensor connected to said machine and adapted to produce an electrical signal in response to the level of one of said plurality of parameters;

means for automatically identifying a beginning and an end of a trend of said parameter level in response to said electrical signal, said means for automatically identifying reducing the likelihood of premature termination of line segment due to aberrant point;

means for calculating the duration and slope of said trend; and means for determining whether a first warning threshold is exceeded in response to the duration and slope of said trend, said first warning threshold being a function of duration and slope, wherein if said first warning threshold is exceeded, a fault is indicated.

2. An apparatus, as set forth in claim 1, including means for obtaining a significance factor, said significance factor being a function of duration and slope, said significance factor being indicative of said parameter level and wherein said first warning threshold is a function of said significance factor.

3. An apparatus, as set forth in claim 1, including means for determining whether a second warning threshold is exceeded in response to the duration and slope of said trend, said second warning threshold being a function of duration and slope, wherein if said first warning threshold is exceeded, a fault is indicated.

4. An apparatus, as set forth in claim 3, including means for obtaining a significance factor, said significance factor being a function of duration and slope, said significance factor being indicative of said parameter level and wherein said second warning threshold is a function of said significance factor.

5. An apparatus, as set forth in claim 1, including means for transmitting said electrical signals to a remote base station.

6. An apparatus, as set forth in claim 5, wherein said means for identifying said trend, said means for calculating the duration and slope of said trend, and said means for determining whether said first warning threshold is exceeded are located at said remote base station.

7. An apparatus, as set forth in claim 1, wherein said means for determining whether said first warning threshold is exceeded includes means for obtaining a significance factor in response to the duration and slope of said trend.

8. An apparatus, as set forth in claim 7, including means for obtaining a weighting factor indicative of the distance of said parameter level from one of a mean value and a warning level and wherein said means for determining whether said first warning threshold is exceeded includes means for multiplying said weighting factor by said significance factor.

9. An apparatus for indicating a fault condition, comprising:

a machine having a plurality of parameters having levels being dependent upon machine performance;

a sensor connected to said machine and adapted to produce an electrical signal in response to the level of one of said plurality of parameters;

means for automatically obtaining a beginning and an end of a line segment in response to a plurality of points defined by said electrical signal, said means for automatically obtaining reducing the likelihood of premature termination of the line segment due to aberrant points;

means for calculating the duration and slope of said line segment; and means for determining whether a first warning threshold is exceeded in response to the duration and slope of said line segment, said first warning threshold being a function of duration and slope, wherein if said first warning threshold is exceeded, a fault is indicated.

10. An apparatus, as set forth in claim 9, wherein said means for obtaining a line segment includes means for obtaining a best-fit line in response to a first subset of parameter data and for determining whether a second subset of parameter data deviates from said best-fit line by more than a predefined tolerance.

11. A method for indicating a fault condition, comprising the steps of:

operating a machine;

sensing a machine parameter having a level being dependent upon machine performance and responsively producing an electrical signal in response to the level of said parameter;

automatically identifying a beginning and an end of a trend in the parameter level in response to the electrical signal, thereby reducing the likelihood of premature termination of line segment due to aberrant points;

calculating the duration and slope of the trend; and determining whether a first warning threshold is exceeded in response to the duration and slope of the trend, the first warning threshold being a function of duration and slope, wherein if said first warning threshold is exceeded, a fault is indicated.

12. A method, as set forth in claim 11, including the step of obtaining a significance factor, said significance factor being a function of duration and slope, said significance factor being indicative of said parameter level and wherein the first warning threshold is a function of said significance factor.

13. A method, as set forth in claim 11, including the step of determining whether a second warning threshold is exceeded in response to the duration and slope of the trend, the second warning threshold being a function of duration and slope, wherein if said second warning threshold is exceeded, a fault is indicated.

14. A method, as set forth in claim 13, including the step of determining a significance factor, said significance factor being a function of duration and slope, said significance factor being indicative of said parameter level and wherein the second warning threshold is a function of said significance factor.

15. A method, as set forth in claim 11, wherein said step of determining whether the first warning threshold is exceeded includes the step of obtaining a significance factor in response to the duration and slope of the trend.

16. A method, as set forth in claim 15, including the step of obtaining a weighting factor indicative of the distance of the parameter level from a warning level and wherein said step of determining whether the first warning threshold is exceeded includes the step of multiplying the weighting factor by the significance factor.

* * * * *